(12) United States Patent
Han et al.

(10) Patent No.: US 12,308,494 B2
(45) Date of Patent: May 20, 2025

(54) SYSTEM AND METHOD FOR FUEL CELL DIAGNOSIS

(71) Applicants: Hyundai Motor Company, Seoul (KR); Kia Corporation, Seoul (KR)

(72) Inventors: Jae Ho Han, Suwon-si (KR); Dae Jong Kim, Yongin-si (KR); Chang Hwa Hyun, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 409 days.

(21) Appl. No.: 17/890,606

(22) Filed: Aug. 18, 2022

(65) Prior Publication Data

US 2023/0268530 A1    Aug. 24, 2023

(30) Foreign Application Priority Data

Feb. 22, 2022    (KR) .................... 10-2022-0022799

(51) Int. Cl.
*H01M 8/04664* (2016.01)
*G07C 5/08* (2006.01)

(52) U.S. Cl.
CPC ...... *H01M 8/04671* (2013.01); *G07C 5/0808* (2013.01); *H01M 2250/20* (2013.01)

(58) Field of Classification Search
CPC ......... H01M 8/04671; H01M 2250/20; H01M 8/04626; H01M 8/04858; H01M 8/04992; H01M 8/04589; H01M 8/04619; H01M 16/006; H01M 8/04679; H01M 8/04552; H01M 8/04082; H01M 8/04313; H01M 8/0438; H01M 8/04537; H01M 8/04664; G07C 5/0808; Y02E 60/50; G01R 31/3658; G01R 31/3606
See application file for complete search history.

(56) References Cited

U.S. PATENT DOCUMENTS

| | | | |
|---|---|---|---|
| 7,791,349 B2* | 9/2010 | Kato | H01M 8/0267 324/426 |
| 2014/0333316 A1* | 11/2014 | Toida | H01M 8/0488 324/426 |
| 2016/0096445 A1* | 4/2016 | Chung | B60L 58/40 701/99 |
| 2017/0125830 A1* | 5/2017 | Jeon | H01M 8/04671 |
| 2020/0185735 A1* | 6/2020 | Kim | H01M 8/0488 |
| 2020/0303752 A1* | 9/2020 | Kim | H01M 8/0488 |

FOREIGN PATENT DOCUMENTS

| | | | |
|---|---|---|---|
| JP | 2009245691 A | * | 10/2009 |
| JP | 2020196906 A | * | 12/2020 |
| KR | 10-1822275 B1 | | 1/2018 |

* cited by examiner

*Primary Examiner* — Eman A Alkafawi
*Assistant Examiner* — Dilara Sultana
(74) *Attorney, Agent, or Firm* — Morgan, Lewis & Bockius LLP

(57) ABSTRACT

A system and method for diagnosing a fuel cell includes one or more fuel cell modules each including a fuel cell stack to output power through a first converter and a battery connected to the fuel cell stack through a second converter; and a controller configured to determine whether diagnosis of the fuel cell stack included in the one or more fuel cell modules is required, and to control the one or more fuel cell module to simultaneously or sequentially diagnose the fuel cell stack determined to require diagnosis based on an output demand power of the one or more fuel cell modules.

20 Claims, 4 Drawing Sheets

SYSTEM AND METHOD FOR FUEL CELL DIAGNOSIS

CROSS REFERENCE TO RELATED APPLICATION

The present application claims priority to Korean Patent Application No. 10-2022-0022799, filed Feb. 22, 2022, the entire contents of which is incorporated herein for all purposes by this reference.

BACKGROUND OF THE PRESENT DISCLOSURE

Field of the Present Disclosure

The present disclosure relates to a system and method for fuel cell diagnosis, more particularly, to a technology for diagnosing the performance of a fuel cell stack in a fuel cell system for power generation including one or more fuel cell modules.

Description of Related Art

A fuel cell is a type of power generation device that directly converts chemical energy generated by oxidation of fuel into electrical energy. It is the same as a chemical cell in that it utilizes oxidation and reduction reactions, but unlike a chemical cell in which a cell reaction occurs in a closed system, in the fuel cell, reactants are continuously supplied from an outside, and reaction products are continuously removed to the outside of a system. Recently, a fuel cell power generation system has been put to practical use, and because the reaction product of the fuel cell is pure water, research for using it as an energy source for an eco-friendly vehicle is being actively conducted.

A fuel cell system includes a fuel cell stack that generates electrical energy through a chemical reaction, an air supply device that supplies air to an air electrode of the fuel cell stack, and a fuel supply device that supplies hydrogen to a hydrogen electrode of the fuel cell stack. That is, air containing oxygen is supplied to the cathode of the fuel cell stack, and hydrogen is supplied to the anode of the fuel cell stack.

A proton exchange membrane/polymer electrolyte membrane fuel cell generates electricity through a chemical reaction of oxygen and hydrogen and additionally generates heat and water. The chemical reaction formula of the polymer electrolyte membrane fuel cell is as follows.

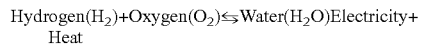

$$Hydrogen(H_2) + Oxygen(O_2) \leftrightarrows Water(H_2O) Electricity + Heat$$

A fuel cell system for power generation is a system including one or more PMC modules applied to a fuel cell vehicle. The PMC module of the fuel cell system for power generation has a low voltage battery and a second converter (BLDC) that provide power when the fuel cell is started instead of a high voltage battery, and a first converter that controls the output of the fuel cell.

A fuel cell system for power generation in which a plurality of PMC modules is connected is a system that continuously provides a constant output for a long time when it starts operating. There is a problem in that it is difficult to apply a pin-hole diagnosis or performance diagnosis function of the fuel cell stack applied to a fuel cell vehicle as it is.

This is because the pinhole diagnosis of the stack may be performed using only the battery in a state where there is no required output, and the performance diagnosis of the stack requires a battery to exhaust the output generated during the diagnosis process.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for applying a stack pinhole diagnosis function and a stack performance diagnosis function for diagnosing a stack state in a configuration of a fuel cell system for power generation to which a plurality of PMCs is connected, furthermore, it is directed to providing a technology for stably supplying system output and guiding early system maintenance by diagnosing the stack status included in a fuel cell system for power generation in real time.

In various aspects of the present disclosure, a system for diagnosing a fuel cell according to an exemplary embodiment of the present disclosure includes one or more fuel cell modules including a fuel cell stack, a battery, a first converter to output power generated by the fuel cell stack, and a second converter connected between the fuel cell stack and the battery; and a controller configured to determine whether diagnosis of the fuel cell stack included in the one or more fuel cell modules is required, and to control the one or more fuel cell module to simultaneously or sequentially diagnose the fuel cell stack determined to require the diagnosis based on output demand powers of the one or more fuel cell modules.

When the controller concludes that failure of an air supply unit, a hydrogen supply unit, the battery, the first converter and the second converter of the fuel cell modules does not occur, the controller may be configured to determine whether diagnosis of the fuel cell modules is required.

The controller may perform the pinhole diagnosis and performance diagnosis of the fuel cell stack when diagnosing the fuel cell stack.

The controller may diagnose the fuel cell stack when an output current of the fuel cell stack is within a preset current section.

The controller may diagnose the fuel cell stack when an output current limit of the fuel cell stack is a preset limit current, an output power limit of the fuel cell stack is a preset limit power, a cell voltage ratio of the fuel cell stack is less than a preset ratio, or a minimum cell voltage of the fuel cell stack is less than a preset cell voltage.

The controller may be configured to determine whether pinhole diagnosis of the fuel cell stack is possible through a battery charge amount or a battery outputtable power, the controller may perform charging of the battery through power generation of the fuel cell stack when the pinhole diagnosis is not possible, and the controller may be configured to control the second converter to drive the fuel cell module through the battery output and prevent power from being output to the first converter when the pinhole diagnosis is possible.

The controller may perform a performance diagnosis of the fuel cell stack when a minimum cell voltage is normal during the pinhole diagnosis of the fuel cell stack, and determine that a pinhole has occurred when the minimum cell voltage is lower than a present voltage.

When diagnosing a pinhole of the fuel cell stack, the controller may be configured to control the one or more fuel cell modules to simultaneously or sequentially diagnose the pinhole of the fuel cell stack based on a sum of the output demand powers of the fuel cell modules and a sum of outputtable powers of the one or more fuel cell modules except for the fuel cell modules determined to require the pinhole diagnosis.

When diagnosing the performance of the fuel cell stack, the controller may diagnose the performance of the fuel cell stack while increasing an output of the fuel cell stack in stages.

When diagnosing performance of the fuel cell stack, the controller may diagnose the performance of the fuel cell stack while sequentially controlling an output limit current of the fuel cell stack to a first limit current and a second limit current set higher than the first limit current, respectively.

A plurality of fuel cell stacks is included in the fuel cell module, and the controller may individually diagnose performance of the plurality of fuel cell stacks.

When diagnosing performance of the fuel cell stacks, the controller may be configured to control the one or more fuel cell modules to simultaneously or sequentially diagnose the performance of the fuel cell stacks based on a sum of the output demand powers of the fuel cell modules and a sum of output powers during the performance diagnosis of the fuel cell modules determined to require the diagnosis.

When diagnosing the performance of the fuel cell stacks, the controller may simultaneously diagnose the performance of the fuel cell stacks when the sum of the output demand powers of the fuel cell modules is greater than the sum of the output powers during the performance diagnosis of the fuel cell modules determined to require the diagnosis.

When diagnosing the fuel cell stacks, if the sum of the output demand powers of the fuel cell modules is less than the sum of the output powers during the performance diagnosis of the fuel cell modules determined to require the diagnosis, the controller may sequentially diagnose the fuel cell stacks with a longest accumulated operation time.

The controller may select the plurality of fuel cell stacks from the fuel cell stacks with the longest accumulated operation time to diagnose the performance, and the controller may select the fuel cell stacks to diagnose the performance within a range in which the sum of the output demand powers of the fuel cell modules is maintained to be greater than the sum of the output powers of the fuel cell modules for which the diagnosis is performed.

A method for diagnosing a fuel cell according to an exemplary embodiment of the present disclosure includes the steps of driving one or more fuel cell modules including a fuel cell stack, a battery, a first converter to output power generated by the fuel cell stack, and a second converter connected between the fuel cell stack and the battery; determining whether diagnosis of the fuel cell stack included in the one or more fuel cell modules is required; and controlling the one or more fuel cell modules to simultaneously or sequentially diagnose the fuel cell stack determined to require the diagnosis based on output demand powers of the one or more fuel cell modules.

In the step of controlling the one or more fuel cell modules, the pinhole diagnosis and performance diagnosis of the fuel cell stack may be performed when the fuel cell stack is diagnosed.

According to the system and method for diagnosing a fuel cell of the present disclosure, it is possible to diagnose the pinhole and performance of the fuel cell stack included in the fuel cell system for power generation in real time.

Accordingly, by diagnosing deterioration in durability or quality problems of the fuel cell stack in real time, it is possible to prevent a system stop due to a failure of the stack at an early stage, and to enable early system repair. Finally, while securing the stability of the power generation system, it has an effect of reducing maintenance/maintenance costs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
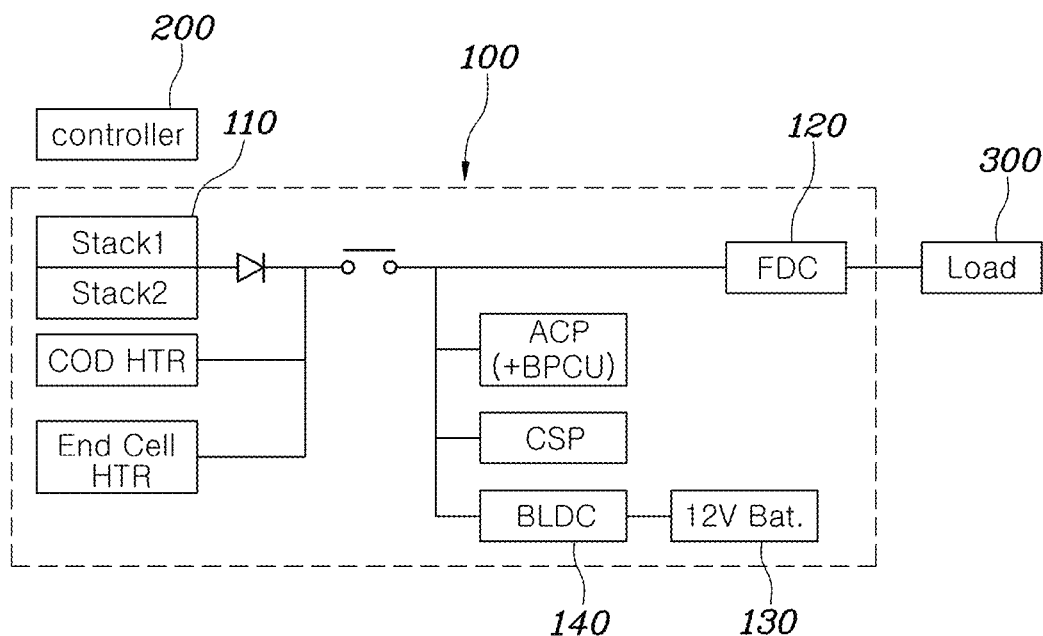
FIG. 1 is a block diagram of a system for diagnosing a fuel cell according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the embodiments of the present disclosure disclosed in the present specification or application are only exemplified for describing the embodiments according to an exemplary embodiment of the present disclosure, and the embodiments according to an exemplary embodiment of the present disclosure may be implemented in various forms and should not be construed as being limited to the embodiments described in the present specification or application.

Since the exemplary embodiment according to an exemplary embodiment of the present disclosure can have various changes and can have various forms, specific embodiments are illustrated in the drawings and described in detail in the present specification or application. However, this is not intended to limit the exemplary embodiment according to the concept of the present disclosure with respect to a specific disclosed form, and should be understood to include all changes, equivalents or substitutes included in the spirit and technical scope of the present disclosure.

Terms such as first and/or second may be used to describe various elements, but the elements should not be limited by the terms. The above terms are used only for the purpose of distinguishing one element from another element, for example, without departing from the scope of the present disclosure, a first element may be called a second element, and similarly the second component may also be referred to as the first component.

When an element is referred to as being "connected" or "contacted" to another element, it may be directly connected or contacted to the other element, but it should be understood that other elements may exist in between. On the other hand, when it is mentioned that a certain element is "directly connected" or "directly contacted" to another element, it should be understood that no other element is present in the middle. Other expressions describing the relationship between elements, such as "between" and "immediately between" or "neighboring to" and "directly adjacent to", etc., should be interpreted similarly.

The terms used herein are used only to describe specific embodiments, and are not intended to limit the present disclosure. The singular expression includes the plural expression unless the context clearly dictates otherwise. In the present specification, terms such as "comprise" or "have" are intended to designate that the described feature, number, step, operation, element, part, or a combination thereof exists, and should be understood that it does not preclude the existence or addition of one or more other features, numbers, steps, operations, elements, parts, or combinations thereof.

Unless defined otherwise, all terms used herein, including technical and scientific terms, have the same meaning as commonly understood by one of ordinary skill in the art to which the present disclosure belongs. Terms such as those defined in commonly used dictionaries should be interpreted as having meanings consistent with the context of the related art, and unless explicitly defined in the present specification, they are not to be interpreted in an ideal or excessively formal meaning.

Hereinafter, the present disclosure will be described in detail by describing exemplary embodiments of the present disclosure with reference to the accompanying drawings. Like reference numerals in each figure indicate like elements.

FIG. 1 is a block diagram of a system for diagnosing a fuel cell according to various exemplary embodiments of the present disclosure.

Referring to FIG. 1, a system for diagnosing a fuel cell according to various exemplary embodiments of the present disclosure includes one or more fuel cell modules 100, each including a fuel cell stack 110 that outputs power through a first converter 120 and a battery 130 which is connected to the fuel cell stack 110 through a second converter 140; and a controller 200 that determines whether the diagnosis of the fuel cell stack 110 included in the one or more fuel cell modules 100 is required, and controls the one or more fuel cell modules 100 to simultaneously or sequentially diagnose the fuel cell stack 110 determined to require diagnosis based on an output demand power of the one or more fuel cell modules 100.

The fuel cell stack 110 is formed by stacking a plurality of cells, and each cell included in the fuel cell stack 110 receives hydrogen through an anode and air containing oxygen through a cathode to generate electricity.

The fuel cell stack 110 may include a membrane electrode assembly (MEA) therein.

The fuel cell stack 110 may be electrically connected to a load device 300 through the first converter 120. The first converter 120 is controlled by the controller 200, and may control the output voltage or output current of the fuel cell stack 110.

The battery 130 may be electrically connected to the fuel cell stack 110 through the second converter 140. The battery 130 may be connected in parallel between the fuel cell stack 110 and the first converter 120 through the second converter 140. The battery 130 may be a high voltage battery 130 that supplements power output from the fuel cell and supplied to the load device 300 or stores surplus power, or a low voltage battery 130 that activates a separate device of the fuel cell module 100 supplying air or hydrogen to the fuel cell stack 110.

The load device 300 is a power consumption device electrically connected to the fuel cell, and may receive the power generated from the fuel cell stack 110. The load device 300 may receive most of demand powers from the fuel cell stack 110, and the battery 130 may supplement insufficient power or store surplus power as an energy buffer.

The fuel cell module 100 may be provided in one or plurality, and one or more fuel cell modules 100 may be simultaneously connected to the load device 300 to supply power to the load device 300.

In an exemplary embodiment of the present disclosure, the present disclosure is applied to a fuel cell system for power generation, and the load device 300 requires a huge amount of industrial power, and the fuel cell module 100 may be provided in plurality.

The controller 200 according to various exemplary embodiments of the present disclosure may be implemented through a non-volatile memory configured to store data relating to an algorithm configured to control the operations of various components of a vehicle or software instructions for reproducing the algorithm, and a processor configured to perform the operations described below using the data stored in the corresponding memory. Here, the memory and the processor may be implemented as separate chips. Alternatively, the memory and processor may be implemented as a single chip integrated with each other. The processor may take the form of one or more processors.

The controller 200 may determine whether the diagnosis of the fuel cell stack 110 included in the one or more fuel cell modules 100 is required, and control the one or more fuel cell modules 100 to diagnose the fuel cell stack 110 determined to require diagnosis based on the determination result.

In an exemplary embodiment of the present disclosure, the controller 200 may diagnose the pinhole of the fuel cell stack 110, and then diagnose the performance of the fuel cell stack 110 as described below.

In diagnosing the pinhole of the fuel cell stack 110, the controller 200 determines whether the pinhole may be diagnosed based on the state of the battery 130, and operates an auxiliary unit and the like necessary for operation of the fuel cell by use of the output power of the battery 130 through the control of the second converter 140, preventing the output power of the fuel cell stack 110 from being output through the first converter 120.

Furthermore, in diagnosing the performance of the fuel cell stack 110, the controller 200 utilizes the output power of the battery 130 so that the output power of the fuel cell stack 110 is controlled to be output through the first converter 120.

Furthermore, the controller 200 may control the one or more fuel cell modules 100 to simultaneously or sequentially diagnose the fuel cell stack 110 which is determined to require diagnosis based on the output demand power of the one or more fuel cell modules 100.

In diagnosing the pinhole of the fuel cell stack 110 or diagnosing the performance of the fuel cell stack 110, the controller 200 may control the fuel cell stack 100 included in the one or more fuel cell modules 100 simultaneously or sequentially, based on the output demand power of the one or more fuel cell modules 100 according to the demand power of the load device 300.

In an exemplary embodiment of the present disclosure, when sequentially diagnosing the fuel cell stack 110 included in one or more fuel cell modules 100, the controller 200 may set a diagnosis order based on the accumulated driving time of the fuel cell module 100. The controller 200 may set the diagnosis order of the fuel cell stack 110 in the order of the longest accumulated driving time of the fuel cell module 100.

The one or more fuel cell modules 100 may independently control the supply of hydrogen or air to each fuel cell stack 110 and the power output from each fuel cell stack 110.

The one or more fuel cell modules 100 are independently driven by the controller 200, and the controller 200 may control the driving or output power of the one or more fuel cell modules 100 based on the demand power of the load device 300. A sub-controller 200 for controlling the driving of each fuel cell module 100 may be further included.

Each fuel cell module 100 independently controls the supply of hydrogen and air to the fuel cell stack 110, and also the control of the power output from each fuel cell stack 110 through the first converter 120 may also be independent.

Each fuel cell module 100 may include an air supply device including an air compressor, a valve and the like for supplying air to the fuel cell stack 110, a hydrogen supply device including a hydrogen supply valve, a shutoff valve, a purge, a drain valve and the like, the battery 130, the second converter 140, the first converter 120 and the like.

Accordingly, the controller 200 can also independently control the diagnosis of the fuel cell stack 110 included in each fuel cell module 100.

The controller 200 may determine whether the diagnosis of the fuel cell stack 110 included in the one or more fuel cell modules 100 is required in a state where the output current of the fuel cell stack 110 is within a preset current section.

The preset current section may be preset in consideration of the number of unit cells of the fuel cell stack 110, an output voltage range, an output current range and the like. The preset current section may be set to be higher than a medium current or a medium output of the fuel cell stack 110.

Furthermore, the controller 200 may determine that the diagnosis of the fuel cell stack 110 is required when the output current limit of the fuel cell stack 110 is a preset limit current, the output power limit of the fuel cell stack 110 is a preset limit power, the cell voltage ratio of the fuel cell stack 110 is less than a preset ratio or the minimum cell voltage of the fuel cell stack 110 is less than a preset cell voltage.

Here, the preset limit current, the preset limit power, the preset ratio, and the preset cell voltage may be preset in consideration of the number of unit cells of the fuel cell stack 110, the output voltage range, the output current range and the like. The medium current or medium output state of the fuel cell stack 110 may be set based on the performance set between BOL (Birth Of Life) performance and EOL (End Of Life) performance. The preset ratio and the preset cell voltage may be set to be higher than the cell voltage ratio and the minimum cell voltage according to the minimum operating voltage reference of the fuel cell stack 110.

The controller 200 determines whether the diagnosis of the fuel cell stack 110 included in the one or more fuel cell modules 100 is required, and then can control the fuel cell module 100 to diagnosis the fuel cell stack 110 determined to require diagnosis.

In an exemplary embodiment of the present disclosure, the controller 200 may diagnose the pinhole of the fuel cell stack 110 determined to require diagnosis, or diagnose the performance of the fuel cell stack 110. In another exemplary embodiment of the present disclosure, the controller 200 may diagnose the pinhole of the fuel cell stack 110 determined to require diagnosis, and then sequentially diagnose the performance of the fuel cell stack 110.

A configuration in which the controller 200 diagnoses the pinhole of the fuel cell stack 110 included in the one or more fuel cell modules 100 is as follows.

The controller 200 determines that the pinhole diagnosis of the fuel cell stack 110 is possible when the charge amount of the battery 130 is equal to or greater than a preset charge amount or when the outputtable power of the battery 130 is greater than or equal to a preset discharge power. In a state in which the first converter 120 or the second converter 140 is controlled so that the output voltage of the fuel cell stack 110 rises to a preset voltage (OCV, for example, about 410V), the controller 200 may diagnose the pinhole of the fuel cell stack 110 based on the minimum cell voltage of the fuel cell stack 110.

The controller 200 may determine that the pinhole diagnosis of the fuel cell stack 100 is possible when the state of charge (SOC) value of the battery 130 is greater than or equal to a preset charge amount or when the outputtable power of the battery 130 is greater than or equal to a preset discharge power.

Here, the preset charge amount may be set as a state in which the charge amount of the battery 130 is sufficient, for example, about 75%. The preset discharge power may be preset as the power required to drive the air compressor so that air may be supplied to the fuel cell stack 110 only with the discharge power of the battery 130.

The controller 200 controls the first converter 120 or the second converter 140 so that the output voltage of the fuel cell stack 110 increases to a preset OCV voltage, and may diagnose the pinhole of the fuel cell stack 110 based on the minimum cell voltage of the fuel cell stack 110 in a state in which the output voltage of the fuel cell stack 110 is maintained to the preset OCV voltage.

In an exemplary embodiment of the present disclosure, the controller 200 may switch the second converter 140 to the Boost state to boost and supply the discharge power of the battery 130, and supply air to the fuel cell stack 110 by use of the supplied discharge power of the battery 130. For example, the controller 200 may supply 60 [kg/h] of air to the fuel cell stack 110 for 10 seconds. In the instant case, the controller 200 may prevent the output of the fuel cell module 100 from being drawn through the first converter 120.

Furthermore, when the minimum cell voltage of the fuel cell stack 110 is less than a preset cell voltage in a state in which the voltage of the fuel cell stack 110 is maintained at the OCV voltage, the controller 200 may determine that a pinhole is generated in the fuel cell stack 110 and guide the system maintenance.

Furthermore, the controller 200 may control the one or more fuel cell modules 100 to diagnosis the pinhole of the fuel cell stack 110 simultaneously or sequentially based on a sum of the output demand powers of the one or more fuel cell modules 100 and a sum of the output powers of the one or more fuel cell modules 100 except for the fuel cell modules 100 determined to require the diagnosis of the fuel cell stack 110.

In an exemplary embodiment of the present disclosure, the controller 200 may determine the sum of the output demand powers of the one or more fuel cell modules 100 according to the demand power of the load device 300, compare with the sum of the outputtable powers of the one or more fuel cell modules 100 except for the fuel cell module 100 determined to require the diagnosis of the fuel cell stack 110, and control the one or more fuel cell modules 100 to diagnose the pinhole of the fuel cell stack 110 simultaneously or sequentially based on the comparison result. That is, when the sum of the demand powers of the load device 300 and the sum of the output demand powers of the one or more fuel cell modules 100 is low, the pinhole of the fuel cell stack 110 may be simultaneously diagnosed.

For example, the controller 200 may diagnose the pinhole of the fuel cell stack 110 requiring the pinhole diagnosis simultaneously, when the sum of the output demand powers is less than 90% of the sum of the outputtable powers of the fuel cell module 100 except for the fuel cell modules 100 determined to require the diagnosis. On the other hand, the controller 200 may diagnose the pinhole of the fuel cell stack 110 requiring the pinhole diagnosis sequentially, when the sum of the output demand powers is greater than or equal to 90% of the sum of the outputtable powers of the fuel cell modules 100 except for the fuel cell modules 100 determined to require the diagnosis.

When the pinholes of the fuel cell stack 110 requiring pinhole diagnosis are sequentially diagnosed, the pinholes of the fuel cell stack 110 may be sequentially diagnosed in an order of a longest accumulated driving time. Furthermore, the controller 200 may control the number of the fuel cell modules 100 for pinhole diagnosis so that the sum of output demand powers is less than 90% of the sum of the output powers of the one or more fuel cell modules 100 except for the fuel cell module 100 for the pinhole diagnosis.

The output demand power may be distributed in a form of duty according to the recovery operation, operation time of the fuel cell stack 110, or performance of individual stack, and a ratio for determining the number of the modules for pinhole diagnosis may be controlled according to the performance distribution of the entire fuel cell stacks 110.

The configuration for diagnosing the performance of the fuel cell stack 110 included in the one or more fuel cell modules 100 by the controller 200 is as follows.

The controller 200 may diagnose the performance of the fuel cell stack 110 based on the output voltage or cell voltage ratio of the fuel cell stack 110 in a state in which the first converter 120 or the second converter 140 is controlled so that the output voltage of the fuel cell stack 110 is maintained at a preset voltage (e.g., 260V).

The controller 200 may switch the mode of the second converter 140 to a buck mode and control so that the output power of the fuel cell stack 110 is drawn from the first converter 120.

In an exemplary embodiment of the present disclosure, the controller 200 may control the first converter 120 or the second converter 140 so that the output voltage of the fuel cell stack 110 becomes a preset voltage. Here, the preset voltage may be set according to the number of unit cells and outputtable range of the fuel cell stack 110. At the same time, the controller 200 may set and maintain an output limit current of the fuel cell stack 110.

The controller 200 may diagnose the performance of the fuel cell stack 110 while sequentially controlling the output limit current of the fuel cell stack 110 to a preset first limit current and a preset second limit current set higher than the present first limit current, respectively, in a state in which the output voltage of the fuel cell stack 110 is maintained at the preset voltage.

Here, the preset first limit current may be preset within the medium output range of the fuel cell stack 110, and the preset second limit current may be preset within the high output range of the fuel cell stack 110.

In another exemplary embodiment of the present disclosure, the controller 200 may diagnose the performance of the fuel cell stack 110 in a state in which it is controlled to the medium output range of the fuel cell stack 110 and the high output range of the fuel cell stack 110 based on the output power of the fuel cell stack 110.

Furthermore, a plurality of fuel cell stacks 110 included in one or more fuel cell modules 100 is provided, and the controller 200 may individually diagnose the performance of the plurality of fuel cell stacks 110.

The fuel cell stack 110 may be configured by stacking a plurality of unit cells, and the plurality of unit cells may be stacked separately from the top and bottom. In an exemplary embodiment of the present disclosure, the fuel cell stack 110 is configured by connecting the plurality of stacks in which unit cells are stacked in parallel, and may be independently driven according to the supply of hydrogen and air.

Accordingly, the controller 200 individually diagnoses the performance of the plurality of fuel cell stacks 110, and accordingly, the fuel cell stacks 110 whose performances have deteriorated among the plurality of fuel cell stacks 110 may be detected.

Furthermore, the controller 200 may control the one or more fuel cell modules 100 so that the performance of the fuel cell stack 100 is diagnosed simultaneously or sequentially, based on the sum of the output demand powers of the one or more fuel cell modules 100 and the sum of the output powers during the performance diagnosis of the fuel cell module 100 determined to require the diagnosis.

The controller 200 may control the performance of the fuel cell stack 110 simultaneously or sequentially by comparing the sum of the output demand powers of the one or more fuel cell modules 100 and the sum of the output powers during the performance diagnosis of the fuel cell modules 100 determined to require the diagnosis of the fuel cell stack 110.

Here, the output power during the performance diagnosis of the fuel cell modules 100 may be the state in which the voltage of the fuel cell stack 110 is preset, and it may be the power for outputting the first limit current preset within the medium output range of the fuel cell stack 110 or the second limit current present within the high output range of the fuel cell stack 110.

In an exemplary embodiment of the present disclosure, the controller 200 may diagnose the performance of the fuel cell stack 110 determined to require the diagnosis simultaneously when the sum of the output demand powers of the one or more fuel cell modules 100 according to the demand power of the load device 300 is greater than the sum of the output powers during the performance diagnosis of the fuel cell modules 100 determined to require the diagnosis of the fuel cell stack 110. Conversely, the controller 200 may diagnose the performance of the fuel cell stack 110 determined to require the diagnosis sequentially when the sum of the output demand powers of the one or more fuel cell modules 100 is less than or equal to the sum of the output powers during the performance diagnosis of the fuel cell modules 100 determined to require the diagnosis of the fuel cell stack 110.

The number of fuel cell modules 100 of which performance is diagnosed may be controlled so that the sum of the output demand powers of the one or more fuel cell modules 100 is greater than the sum of the output powers during the performance diagnosis of the fuel cell modules 100 to be diagnosed.

Furthermore, the output power of the stacks for which performance diagnosis is unnecessary may be set by dividing the surplus output power obtained by subtracting the sum of output powers of stacks performing performance diagnosis from the sum of the output demand powers of the one or more fuel cell modules 100 of the power generation system, by the number of the stacks for which performance diagnosis is unnecessary. The output demand powers may be distributed in a form of duty according to the recovery operation, operation time of the fuel cell stack 110, or individual stack performance.

Figure 2:
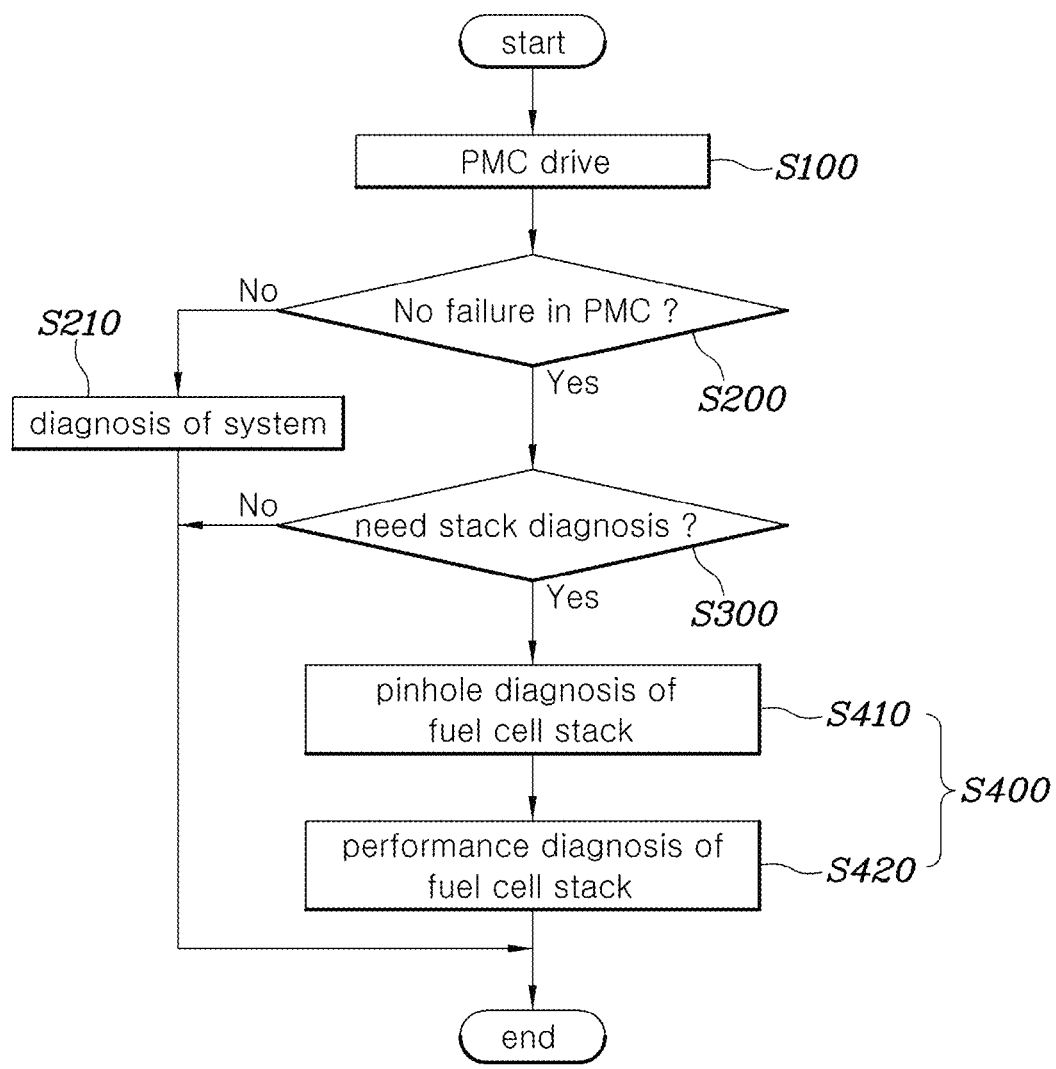
FIG. 2 is a flowchart of a method for diagnosing a fuel cell according to various exemplary embodiments of the present disclosure.

FIG. 2 is a flowchart of a method for diagnosing a fuel cell according to various exemplary embodiments of the present disclosure.

Referring to FIG. 2, the method for diagnosing a fuel cell according to various exemplary embodiments of the present disclosure includes the steps of driving the one or more fuel cell modules 100, each including the fuel cell stack 110 to output power through the first converter 120 and the battery 130 connected to the fuel cell stack 110 through the second converter 140 (S100); determining whether diagnosis of the fuel cell stack 110 included in the one or more fuel cell modules 100 is required (S300); and controlling the one or more fuel cell modules 100 to simultaneously or sequentially diagnose the fuel cell stack 100 determined to require diagnose based on the output demand powers of the one or more fuel cell modules 100 (S400).

In the step of driving the one or more fuel cell modules 100 (S100), the electric power may be generated by independently supplying hydrogen and air to the fuel cell stack 110 included in the one or more individually driven fuel cell modules 100.

In the step of determining whether diagnosis is required (S300), whether the diagnosis of the fuel cell stack 110 included in the one or more fuel cell modules 100 is required may be determined in a state in which the output current of the fuel cell stack 110 is within a preset current section.

In the step of determining whether diagnosis is required (S300), it may be determined that the diagnosis of the fuel cell stack 110 is required when the output current limit of the fuel cell stack 110 is a preset limit current, the output power limit of the fuel cell stack 110 is a preset limit power, the cell voltage ratio of the fuel cell stack 110 is less than a preset ratio, or the minimum cell voltage of the fuel cell stack 110 is less than a preset cell voltage.

The method further includes a step (S200) of determining whether a failure has occurred in the one or more fuel cell modules 100 prior to the step (S300) of determining whether diagnosis is required, and in the step of determining whether diagnosis is required, whether the diagnosis of one or more fuel cell modules 100 determined to have no failure is required may be determined.

Each of the fuel cell modules 100 may include the air supply device including an air compressor, a valve and the like for supplying air to the fuel cell stack 110, the hydrogen supply valve including a hydrogen supply valve, a shutoff valve, a purge, a drain valve and the like, the battery 130, the second converter 140, the first converter 120 and the like.

In the step (S200) of determining whether a failure has occurred, it may be determined whether a failure has occurred in the air supply device, the hydrogen supply device, the battery 130, the second converter 140 or the first converter 120 included in each of the fuel cell modules 100. When the occurrence of a failure is detected, it is determined that the diagnosis of the fuel cell stack 110 is impossible, so that the maintenance of the system may be guided in S210.

Figure 3:
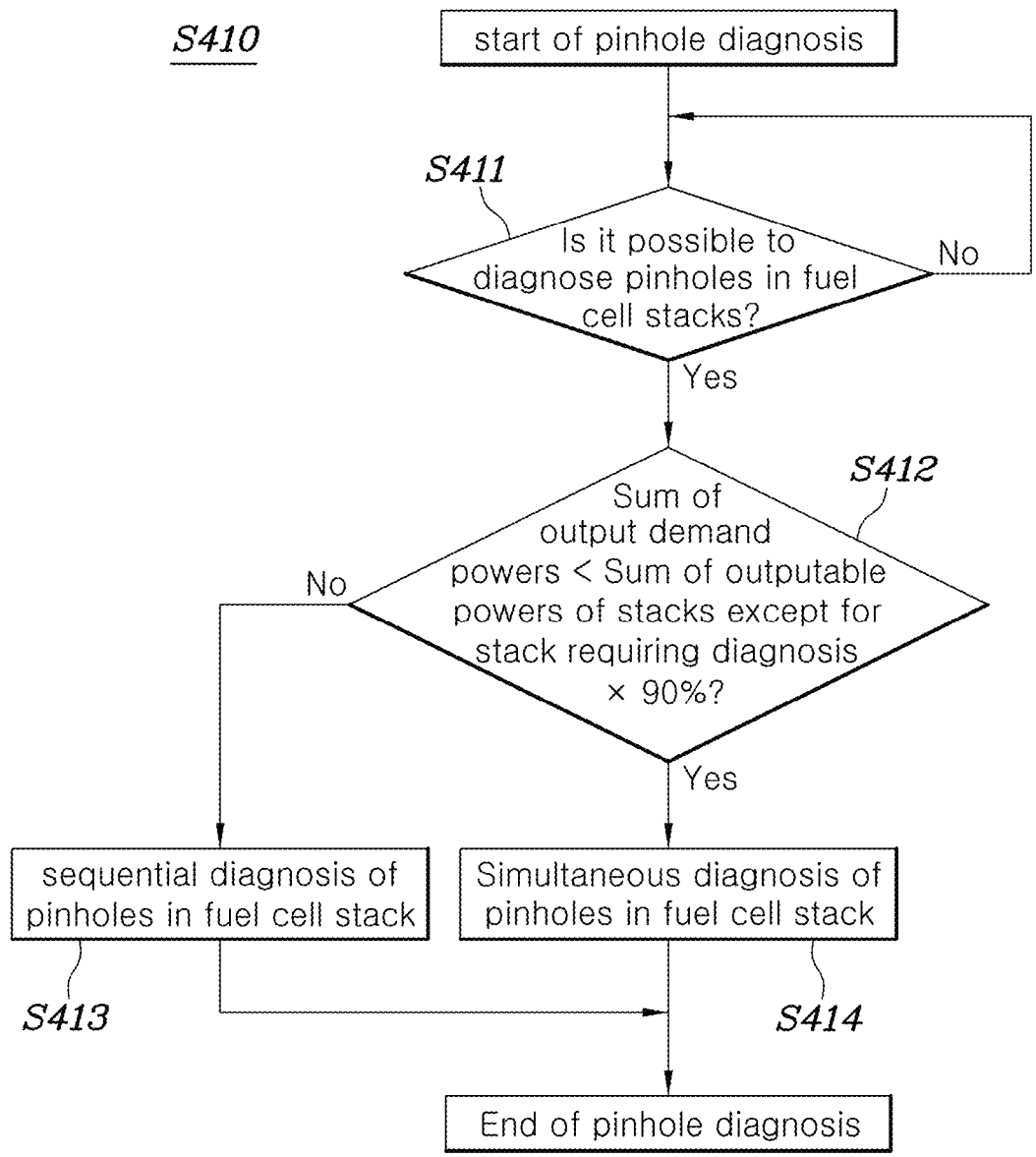
FIG. 3 is a flowchart of a pinhole diagnosis of a stack according to a method for diagnosing a fuel cell according to various exemplary embodiments of the present disclosure.

FIG. 3 is a flowchart of a pinhole diagnosis of a stack according to a method for diagnosing a fuel cell according to various exemplary embodiments of the present disclosure.

Referring further to FIG. 3, after the step of determining whether diagnosis is required (S300), the method may further include the steps of determining that the pinhole diagnosis of the fuel cell stack 110 is possible when the charge amount of the battery 130 is greater than or equal to a preset charge amount or the outputtable power of the battery 130 is greater than or equal to a preset discharge power (S411). In the step of controlling the one or more fuel cell modules 100 (S400), the pinhole of the fuel cell stack 110 may be diagnosed based on the minimum cell voltage of the fuel cell stack 110 in a state in which the first converter 120 or the second converter 140 is controlled so that the output voltage of the fuel cell stack 110 is maintained to the preset OCV voltage (S410).

In the step of controlling the one or more fuel cell modules 100 (S400), the one or more fuel cell modules 100 may be controlled to diagnose the pinhole of the fuel cell stack 110 simultaneously or sequentially based on the sum of the output demand powers of the one or more fuel cell modules 100 and the sum of the output powers of the one or more fuel cell modules 100 except for the fuel cell modules 100 determined to require diagnosis of the fuel cell stack 110 (S412, 5413, S414).

Figure 4:
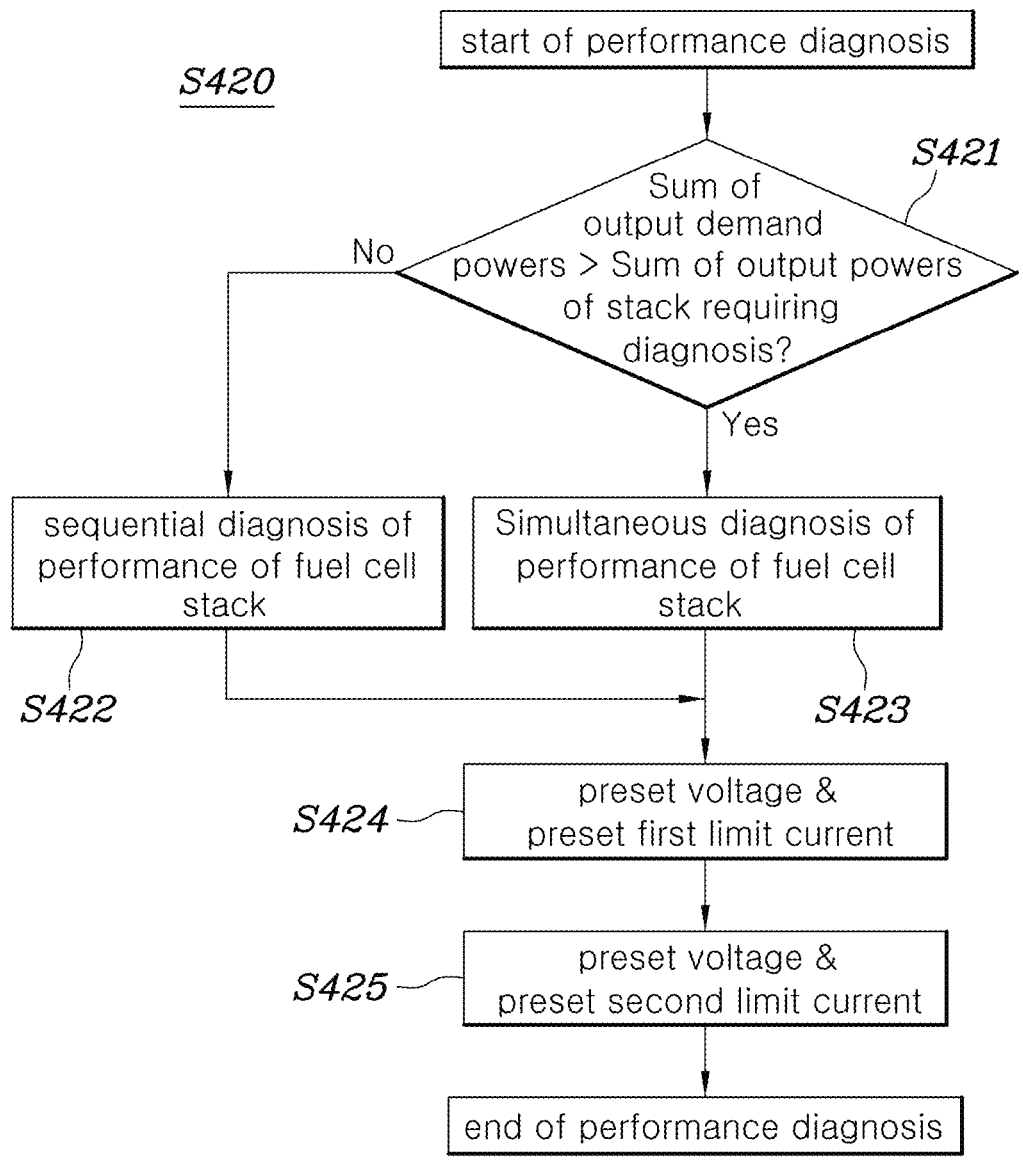
FIG. 4 is a flowchart of a performance diagnosis of a stack according to a method for diagnosing a fuel cell according to various exemplary embodiments of the present disclosure.

FIG. 4 is a flowchart of a performance diagnosis of a stack according to a method for diagnosing a fuel cell according to various exemplary embodiments of the present disclosure.

Referring further to FIG. 4, in the step of controlling the one or more fuel cell modules 100 (S400), the performance of the fuel cell stack 110 may be diagnosed based on the output voltage or cell voltage ratio of the fuel cell stack 110 in a state in which the first converter 120 or the second converter is controlled so that the output voltage of the fuel cell stack 110 becomes the preset voltage (S420).

In the step of controlling the one or more fuel cell modules 100 (S400), the performance of the fuel cell stack 100 may be diagnosed while sequentially controlling the output limit current of the fuel cell stack 110 to the preset first limit current and to the preset second limit current set to be higher than the preset first limit current in a state in which the output voltage of the fuel cell stack 110 is maintained to be the preset voltage (S424 and S425).

In the step of controlling the one or more fuel cell modules 100 (S400), the one or more fuel cell modules 100 may be controlled to simultaneously or sequentially diagnose the performance of the fuel cell stack 110 based on the sum of the output demand powers of the one or more fuel cell modules 100 and the sum of the output powers during the performance diagnosis of the fuel cell modules 100 determined to require the diagnose of the fuel cell stack 110 (S421, 5422, and S423). It is possible to determine whether the performance of the fuel cell stack is suitable based on whether the voltage of each cell is maintained above a predetermined level or the voltages of the entire modules is maintained above a predetermined level.

Through the above process, the pinhole occurrence or performance degradation of the fuel cell stack may be detected, and when it is determined that there is a pinhole, a corresponding warning is output to guide maintenance, and when performance degradation is detected, a corresponding warning is also output to guide maintenance.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for diagnosing a fuel cell, the system comprising:
   one or more fuel cell modules including a fuel cell stack, a battery, a first converter to output power generated by the fuel cell stack, and a second converter connected between the fuel cell stack and the battery; and
   a controller configured to determine whether diagnosis of the fuel cell stack included in the one or more fuel cell modules is required, and to control the one or more fuel cell module to simultaneously or sequentially diagnose the fuel cell stack determined to require the diagnosis based on output demand powers of the one or more fuel cell modules,
   wherein the controller is configured to control the one or more fuel cell modules to simultaneously diagnose the fuel cell stack determined to require the diagnosis when the output demand powers of the one or more fuel cell modules satisfy a preset condition, and
   wherein the controller is configured to control the one or more fuel cell modules to sequentially diagnose the fuel cell stack determined to require the diagnosis when the output demand powers of the one or more fuel cell modules fail to satisfy the preset condition.

2. The system of claim 1, wherein the controller is configured to determine whether the diagnosis of the one or more fuel cell modules is required, when an air supply unit, a hydrogen supply unit, the battery, the first converter and the second converter of the one or more fuel cell modules are functioning at a normal operative state.

3. The system of claim 1, wherein the controller is configured to perform pinhole diagnosis and performance diagnosis of the fuel cell stack when diagnosing the fuel cell stack.

4. The system of claim 1, wherein the controller is configured to diagnose the fuel cell stack when an output current of the fuel cell stack is within a preset current section.

5. The system of claim 4, wherein the controller is configured to diagnose the fuel cell stack when an output current limit of the fuel cell stack is a preset limit current, an output power limit of the fuel cell stack is a preset limit power, a cell voltage ratio of the fuel cell stack is less than a preset ratio, or a minimum cell voltage of the fuel cell stack is less than a preset cell voltage.

6. The system of claim 1, wherein the controller is configured to determine whether pinhole diagnosis of the fuel cell stack is possible through a battery charge amount or a battery outputtable power, the controller is configured to perform charging of the battery through power generation of the fuel cell stack when the controller determines that the pinhole diagnosis is not possible, and the controller is configured to control the second converter to drive the one or more fuel cell modules through output of the battery and to prevent power from being output to the first converter when the controller determines that the pinhole diagnosis is possible.

7. The system of claim 6, wherein the controller is configured to perform performance diagnosis of the fuel cell stack when a minimum cell voltage is normal during the pinhole diagnosis of the fuel cell stack, and to determine that a pinhole has occurred when the minimum cell voltage is lower than a present voltage.

8. The system of claim 1, wherein when diagnosing a pinhole of the fuel cell stack, the controller is configured to control the one or more fuel cell modules to simultaneously or sequentially diagnose the pinhole of the fuel cell stack based on a sum of the output demand powers of the one or more fuel cell modules and a sum of outputtable powers of the one or more fuel cell modules except for at least one fuel cell module determined to require the pinhole diagnosis.

9. The system of claim 1, wherein when diagnosing performance of the fuel cell stack, the controller is configured to diagnose the performance of the fuel cell stack while increasing an output of the fuel cell stack in stages.

10. The system of claim 1, wherein when diagnosing performance of the fuel cell stack, the controller is configured to diagnose the performance of the fuel cell stack while sequentially controlling an output limit current of the fuel cell stack to a first limit current and a second limit current set higher than the first limit current, respectively.

11. The system of claim 1, wherein each of the one or more fuel cell modules is provided with a plurality of fuel cell stacks, and the controller individually diagnoses performance of the plurality of fuel cell stacks.

12. The system of claim 11, wherein when diagnosing performance of the fuel cell stacks, the controller is configured to control the one or more fuel cell modules to simultaneously or sequentially diagnose the performance of the fuel cell stacks based on a sum of the output demand powers of the one or more fuel cell modules and a sum of output powers during the performance diagnosis of the one or more fuel cell modules determined to require the diagnosis.

13. The system of claim 12, wherein when diagnosing the performance of the fuel cell stacks, the controller simultaneously diagnoses the performance of the fuel cell stacks when the sum of the output demand powers of the one or more fuel cell modules is greater than the sum of the output powers during the performance diagnosis of the one or more fuel cell modules determined to require the diagnosis.

14. The system of claim 12, wherein when diagnosing the fuel cell stacks, when the sum of the output demand powers of the one or more fuel cell modules is less than the sum of the output powers during the performance diagnosis of the one or more fuel cell modules determined to require the diagnosis, the controller sequentially diagnoses the fuel cell stacks with a longest accumulated operation time.

15. The system of claim 14, wherein the controller is configured to select fuel cell stacks from the fuel cell stacks with the longest accumulated operation time to diagnose the performance, and the controller is configured to select the fuel cell stacks to diagnose the performance within a range in which the sum of the output demand powers of the one or more fuel cell modules is maintained to be greater than the sum of the output powers of the one or more fuel cell modules for which the diagnosis is performed.

16. A method for diagnosing a fuel cell, the method comprising:
driving one or more fuel cell modules including a fuel cell stack, a battery, a first converter to output power generated by the fuel cell stack, and a second converter connected between the fuel cell stack and the battery;
determining whether diagnosis of the fuel cell stack included in the one or more fuel cell modules is required; and
controlling the one or more fuel cell modules to simultaneously or sequentially diagnose the fuel cell stack determined to require the diagnosis based on output demand powers of the one or more fuel cell modules,
wherein the controlling includes controlling the one or more fuel cell modules to simultaneously diagnose the fuel cell stack determined to require the diagnosis when the output demand powers of the one or more fuel cell modules satisfy a preset condition, and
wherein the controlling includes controlling the one or more fuel cell modules to sequentially diagnose the fuel cell stack determined to require the diagnosis when the output demand powers of the one or more fuel cell modules fail to satisfy the preset condition.

17. The method of claim 16, wherein in the controlling the one or more fuel cell modules, pinhole diagnosis and performance diagnosis of the fuel cell stack are performed when the fuel cell stack is diagnosed.

18. The method of claim 16, further including:
determining whether pinhole diagnosis of the fuel cell stack is possible through a battery charge amount or a battery outputtable power;
performing charging of the battery through power generation of the fuel cell stack when determining that the pinhole diagnosis is not possible; and
controlling the second converter to drive the one or more fuel cell modules through output of the battery and to prevent power from being output to the first converter when determining that the pinhole diagnosis is possible.

19. The method of claim 16, wherein when diagnosing a pinhole of the fuel cell stack, the one or more fuel cell modules are controlled to simultaneously or sequentially diagnose the pinhole of the fuel cell stack based on a sum of the output demand powers of the one or more fuel cell modules and a sum of outputtable powers of the one or more fuel cell modules except for at least one fuel cell module determined to require the pinhole diagnosis.

20. The method of claim 16, wherein in the controlling the one or more fuel cell modules, performance diagnosis of the fuel cell stack is performed while sequentially controlling an output limit current of the fuel cell stack to a first limit current and a second limit current set higher than the first limit current, respectively.

* * * * *